United States Patent [19]

Kudo et al.

[11] 4,144,287
[45] Mar. 13, 1979

[54] IMPACT-RESISTANT RESIN COMPOSITION

[75] Inventors: Teizo Kudo; Shoji Furukawa; Keizi Kubo, all of Sakai, Japan

[73] Assignee: Daicel Ltd., Sakai, Japan

[21] Appl. No.: 846,352

[22] Filed: Oct. 28, 1977

[30] Foreign Application Priority Data

Oct. 29, 1976 [JP] Japan ................. 51-130934

[51] Int. Cl.$^2$ .............................................. C08L 53/02
[52] U.S. Cl. ........................... 260/876 R; 260/880 R; 260/890; 260/893; 260/897 B; 260/899
[58] Field of Search ........................... 260/876 R, 890

[56] References Cited

U.S. PATENT DOCUMENTS

| 3,494,982 | 2/1970 | Grabowski et al. | 260/876 R |
|---|---|---|---|
| 3,509,237 | 4/1970 | Aubrey | 260/880 |
| 3,515,774 | 6/1970 | Lee | 260/876 R |

Primary Examiner—J. Ziegler
Attorney, Agent, or Firm—Blanchard, Flynn, Thiel, Boutell & Tanis

[57] ABSTRACT

An impact-resistant resin composition comprises:
  100 parts by weight of a mixture of graft copolymers consisting of;
  50–90% by weight of a graft copolymer (A) obtained by polymerizing an aromatic monoalkenyl monomer and a vinyl cyan monomer in the presence of a diene type rubber component first under the bulk polymerization condition and subsequently continuing the polymerization under the suspension polymerization condition to substantially complete the polymerization, and having dispersed therein the rubber of an average particle size in the range of from 0.2 to 0.7 microns, and 10–50% by weight of a graft copolymer (B) obtained by polymerizing an aromatic monoalkenyl monomer, a vinyl cyan monomer and/or an alkyl ester monomer of acrylic acid or methacrylic acid in the presence of a diene type rubber latex under the emulsion polymerization condition; and
3–30 parts by weight, based on 100 parts by weight of said mixture of said graft copolymers, of a chlorinated polyethylene having a degree of chlorination of from 25 to 45% by weight.

11 Claims, No Drawings

IMPACT-RESISTANT RESIN COMPOSITION

BACKGROUND OF THE INVENTION

1. Field of the Invention

This invention relates to an impact-resistant resin composition having excellent mechanical strength, and good luster, shapability and weatherability, as well.

More specifically, the present invention relates to an impact-resistant resin composition having excellent mechanical strength, shapability and weatherability which comprises a graft copolymer (A) obtained by the bulk-suspension polymerization of an aromatic monoalkenyl monomer and a vinyl cyan monomer in the presence of a diene type rubber component and having dispersed therein rubbers of a specific particle size, a graft copolymer (B) obtained by the emulsion-polymerization of the above-mentioned monomers and a mixture of said monomers and an alkyl ester monomer of (meth)acrylic acid in the presence of a diene type rubber latex, and a chlorinated polyethylene (C) having a degree of chlorination of from 25 to 45% by weight.

2. Description of Prior Arts

An impact-resistant resin prepared from a butadiene type rubber component, an aromatic monoalkenyl monomer and a vinyl cyan monomer is referred to as an ABS resin and has gained broad applications because of its excellent mechanical properties and moldability.

As typical production methods of this ABS resin, the bulk-suspension polymerization method and the emulsion polymerization method have been well known.

In producing the ABS resin by the emulsion polymerization method, for example, the copolymerization is effected whereby the vinyl monomer is grafted to the rubber latex. Hence, it is possible to optionally vary the rubber content in the resin. Since the particle size of the rubber latex is generally small, however, the resulting resin has a small mechanical strength in comparison with the rubber content in the resin. Moreover, an emulsifier, a coagulating agent and the like used during the production process persistently remain in the resin, and the ABS having a high impact-resistance produced by the emulsion polymerization method is inferior with respect to its weatherability and thermal stability.

Further, the ABS resin prepared by the bulk-suspension polymerization method does not contain impurities such as the abovementioned emulsifier, and has excellent thermal stability. In the bulk-suspension polymerization method, however, the diene type rubber component is dissolved in the vinyl monomer and thus subjected to the polymerization so that it may be not easy to obtain an ABS resin having a high rubber concentration. In addition, the particle size of the rubber in the resulting resin is relatively large. Consequently, though the resulting resin exhibits good mechanical strength in comparison with the rubber concentration, an article molded therefrom has a poor luster. Thus, the commercial use of the resin is deteriorated.

On the other hand, it is well known that when chlorinated polyethylene is compounded with styreneacrylonitrile copolymer and ABS resin, the mechanical strength, especially impact resistance, is improved. However, when the chlorinated polyethylene is compounded with the ABS resin prepared by the emulsion polymerization method, the resulting resin composition has remarkably inferior thermal stability and moldability probably because of the presence of impurities such as the aforementioned emulsifier. In order to improve the impact resistance of the resin composition by compounding the chlorinated polyethylene with the ABS resin prepared by the bulk-suspension polymerization method, it is necessary to blend a considerably large amount of the chlorinated polyethylene. For this reason, characteristic properties of the ABS resin produced by the bulk-suspension polymerization method, such as good thermal stability, are deteriorated and at the same time, its heat resistance as well as rigidity are also lowered. It has been found that a resin composition having a good balance of properties can not be obtained.

SUMMARY OF THE INVENTION

The inventors of this invention have made intensive researches about the blend of the ABS resins prepared by the abovementioned two production methods and the chlorinated polyethylene, which has resulted in the present invention.

In accordance with the present invention, there is provided an impact-resistant resin composition consisting essentially of;

100 parts by weight of a mixture of graft copolymers consisting of;

50–90% by weight of a graft copolymer (A) obtained by polymerizing an aromatic monoalkenyl monomer and a vinyl cyan monomer in the presence of a diene type rubber component first under the bulk polymerization condition and subsequently continuing the polymerization under the suspension polymerization condition to substantially complete the polymerization, and having dispersed therein the rubber of an average particle size in the range of from 0.2 to 0.7 micron, and 10–50% by weight of a graft copolymer (B) obtained by polymerizing an aromatic monoalkenyl monomer, a vinyl cyan monomer and/or an alkyl ester monomer of acrylic acid or methacrylic acid in the presence of a diene type rubber latex under the emulsion polymerization condition; and 3–30 parts by weight, preferably 5–30 parts, based on 100 parts by weight of said mixture of said graft copolymer, of a chlorinated polyethylene having a degree of chlorination of from 25 to 45% by weight.

The average particle size of the rubber in the ABS resin obtained by the bulk-suspension polymerization method is generally about 1 micron, and the luster of an article molded from such a resin is not preferable. If the average particle size of the rubber is not greater than about $0.7\mu$ on the contrary, the luster of the molded article is improved to a considerable extent. However, referring to the fact that the rubber content of ABS resin is inherently restricted by the bulk-suspension polymerization method, when the rubber is finely divided to smaller particle size, the properties of the resin, such as impact resistance, disappear. The mechanical strength of this ABS resin having the dispersed rubber of a small particle size, which is obtained by the bulk-suspension polymerization method, can be compensated by blending therewith an ABS resin of a relatively small rubber particle size and yet of a high rubber content obtained by the emulsion polymerization method. Notwithstanding, the weatherability and thermal stability lower in such a blend. In order to maintain good moldability and thermal stability which are features of the ABS resin obtained by the bulk-suspension polymerization method, therefore, it is essentially required to keep an amount of the added ABS resin obtained by the emulsion polymerization method in a minor proportion, i.e., not larger than 50% by weight.

If the amount is within the abovementioned minor range, it is sometimes impossible to obtain sufficient mechanical strength. Surprisingly, it has been found however that there is obtained a resin composition having a remarkably excellent impact resistance and properties such as weatherability, thermal stability, and luster, which keep their balance, by adding with a mixture of the ABS resin obtained by the bulk-suspension polymerization and having dispersed therein a rubber of an average particle size of from 0.2 to 0.7 micron and the ABS resin obtained by the emulsion polymerization method wherein the former is predominently present with respect to the latter, 5–30 parts by weight, based on 100 parts by weight of the total of said ABS resins, a chlorinated polyethylene having a chlorination degree of from 25 to 45% by weight. It is assumed that the excellent properties of the resin composition arise from the synergistic effect between the chlorinated polyethylene added and a good balance keeping mixture of the ABS resin having the dispersed rubber of a specific particle size and prepared by the bulk polymerization method and the ABS resin obtained by the emulsion polymerization method.

Examples of the diene type rubber component used for the graft copolymer (A) by the bulk polymerization method in the present invention include butadiene rubbers and isoprene rubbers. Among them, preferred are polybutadiene and butadiene-styrene copolymer rubbers having a relatively high stereoregularity prepared by the use of a lithium catalyst or an organometallic catalyst.

There is no specific limitation to the amount of the diene type rubber component used. Generally speaking, 2 to 40 parts by weight of the rubber component is used per 100 parts by weight of the vinyl monomer mixture. In order to control the average particle size of the dispersed rubber particles to 0.2–0.7 micron, 2–20 parts by weight of the component is suitably employed.

Styrene is most suited as the aromatic monoalkenyl monomer used for the graft copolymer (A). Various substituted styrenes such as α-methyl styrene and p-methyl styrene may also be used. In addition, a mixture of styrene and substituted styrene may be likewise used.

Acrylonitrile is most suited as the vinyl cyan monomer, but methacrylonitrile may also be used. There is no specific limitation to the proportion of the aromatic monoalkenyl monomer to the vinyl cyan monomer. Generally, however, 80–55% by weight of the aromatic monoalkenyl monomer is used as against 20–45% by weight of the vinyl cyan monomer.

In producing the graft copolymer (A) of the present invention, known polymerization initiators and molecular weight-regulating agents may be employed without particular restriction to their kind and amount. At times, these agents may be accumulatively and dividedly added during each step of the bulk polymerization and the suspension polymerization. There is no restriction, either, to the type of suspending and dispersing agents. It is possible to use, for example, a so-called organic protective colloid such as polyvinyl alcohol and hydroxyethyl cellulose, or a finely divided powder of inorganic salts such as calcium phosphate and magnesium hydroxide. There is no specific limitation, either, to the polymerization temperature. However, it is generally preferred to carry out the bulk polymerization at 60°–100° C. and the suspension polymerization at 60°–140° C.

The control of the average particle size of the dispersed rubber, which is one of the most significant conditions in the present invention, is carried out by adjusting the agitation force during the bulk polymerization process, or by the batchwise addition method of the molecular weight-regulating agent and the vinyl monomer. It s considerably difficult to attain the average particle size of not greater than $0.2\mu$ and at the same time, the dispersed rubber of so small an average particle size provides the final resin composition with decreased mechanical strength. On the other hand, the average particle size of greater than $0.7\mu$ gives poor luster to an article molded from the final resin composition.

The ordinary emulsion polymerization condition is employed for the production of the graft copolymer (B) of the present invention. Examples of the diene type rubber latex are polybutadiene latex and rubber latex of copolymers between butadiene and vinyl monomers such as styrene, acrylonitrile and methyl methacrylate. The rubber latex need not substantially be cross-linked, or may contain cross-linked gels.

No specific limitation is imposed on the amount of the used diene type rubber latex. Generally, however, 10–100 parts by weight of the rubber component is used per 100 parts by weight of the vinyl monomer mixture.

The kind of the aromatic monoalkenyl monomer and the vinyl cyan monomer to be used for the graft copolymer (B) of the present invention is the same as those of the graft copolymer (A) already illustrated. As the alkyl ester of acrylic acid or methacrylic acid, suited most is methyl methacrylate. In addition, it is also possible to use esters of alkyl alcohols having carbon atoms of up to about 18.

There is no specific restriction to the proportion in mixing the vinyl monomers. Generally, 50–80% by weight of the aromatic monoalkenyl monomer, 0–45% by weight of the vinyl cyan monomer and 0–50% by weight of the alkyl ester of acrylic acid or methacrylic acid are used. The vinyl monomer may be used in its full amount from the start of the polymerization or at times, added continuously or dividedly.

Specific examples of the surface active agent used for the emulsion polymerization in producing the graft copolymer (B) are anionic surface active agents such as sodium alkylbenzenesulfonate, sodium salts of higher alcohol-sulfuric acid esters, sodium and potassium salts of disproportionated abietic acid, and sodium and potassium salts of higher fatty acids.

Examples of the polymerization initiator are persulfates such as potassium persulfate, hydroperoxides such as p-menthan hydroperoxide, and the combination of cumene hydroperoxide-$Fe^{++}$-grape sugar. Known molecular weight regulating agents may be used in the invention.

The chlorinated polyethylene (C) having a degree of chlorination of 25–45% by weight in the present invention is obtained by chlorinating polyethylene, ethylene-propylene copolymer or ethylene-butene copolymer in a customary manner. It is preferred in this case that the bonding chlorines are distributed in the polymer as uniformly as possible, and no residual crystal is substantially present which lowers the action as the rubber.

The blend proportion of the graft copolymers (A) and (B) and the chlorinated polyethylene (C) is as follows. First, the proportion of the graft copolymer (A)

to the graft copolymer (B) is 50–90% by weight: 10–50% by weight. If the blend amount of the graft copolymer (A) exceeds 90% by weight, the final resin composition containing the chlorinated polyethylene has a small mechanical strength. If it is smaller than 50% by weight, on the other hand, it is impossible to obtain a resin composition having a good balance of properties and excellent thermal stability which constitutes the characteristic feature of the present invention.

Moreover, 5–30 parts by weight of the chlorinated polyethylene (C) having a chlorination degree of 25–45% by weight is blended per 100 parts by weight of the mixture of the abovementioned graft copolymers (A) and (B) having the abovementioned proportion. If the amount of the chlorinated polyethylene (C) is smaller than 5 parts by weight, the final resin composition has a small mechanical strength and if it is greater than 30 parts by weight, there is obtained no resin composition having good thermal stability.

It is also possible to incorporate general additives such as heat-stabilizer, a lubricant, a plasticizer and an antioxidant, whenever desired, in addition to the abovementioned three components (A), (B) and (C).

Mixing methods of the graft copolymers (A) and (B) and the chlorinated polyethylene (C) in the present invention are optional without specific limitation in respect to means and the order of mixing. Namely, the mixing may be effected using a customary mixing means such as heat rolls, a Banbury mixer and an extruder.

Incidentally, the measurement of the average particle size of the rubber in the graft copolymer (A) specified in the present invention is conducted by taking an electron microscopic picture by the osmium coloring method. The particle diameter r is a mean value given by the following equation $$r = (a + b)/2$$

where
a is a maximum diameter of the dispersed rubber particle, and
b is a diameter passing the center of a and crossing it at right angles.

The average particle size $\bar{r}$ is determined by measuring at least 100 rubber particles in accordance with the following equation;

$$\bar{r} = \sum_{i=1}^{n} (n_i r_i)^{\frac{1}{2}}/n$$

The present invention will be more fully illustrated with reference to the following examples in which the term "part" designates "part by weight".

Referential Example

[Production of the graft copolymer (A)]

| Graft copolymer | Composition | | | |
|---|---|---|---|---|
| (A)-I | A | | B | |
| Styrene-butadiene rubber ("Tafden 2000A", a product of Asahi Kasei Kogyo K.K.) | 8 | parts | | |
| Styrene | 64 | " | 10 | parts |
| Acrylonitrile | 26 | " | | |
| Benzoylperoxide | 0.15 | " | | |
| Dicumylperoxide | 0.08 | " | | |
| Tertiary dodecylmercaptan | 0.25 | " | 0.20 | " |

The above mentioned composition A is charged into a sealed type reactor equipped with a strong stirrer. After the rubber component has been perfectly dissolved, the temperature is elevated to 70° C. and the bulk polymerization is carried out for 4 hours whereupon the composition B is added and stirred for 10 minutes.

The abovementioned reaction mixture is transferred to another sealed reactor in which in aqueous dispesion consisting of 100 parts of water, 4 parts of magnesium hydroxide and 0.05 parts of sodium laurate have been in advance charged, and the mixture is then stirred and suspended.

Thereafter, the temperature is elevated to 120° C., and the suspension polymerization is effected for 5 hours. After the resulting polymer particles are cooled, the dispersant is decomposed with hydrochloric acid. The polymer particles are washed with water and then dried. The resulting graft copolymer is designated (A)-I.

The average rubber particle size in the graft copolymer (A)-I is 0.35µ and its melt viscosity is 8700 poises (measured at 240° C./40 Kg load using a Kohka-type flow tester; hereinafter the same).

| Graft copolymer | Composition | | | |
|---|---|---|---|---|
| (A)-II | A | | B | |
| Styrene-butadiene rubber ("Tafden 2000A", a product of Asahi Kasei Kogyo K.K.) | 10 | parts | | |
| Styrene | 62 | " | 10 | parts |
| Acrylonitrile | 28 | " | | |
| Benzoylperoxide | 0.15 | " | | |
| Dicumylperoxide | 0.08 | " | | |
| Tertiary dodecylmercaptan | 0.30 | " | 0.15 | " |

A graft copolymer is prepared in the same way as in the production of the graft copolymer (A)-I except that the abovementioned compositions A and B are used. The resulting graft copolymer is designated (A)-II.

The graft copolymer (A)-II has the rubber of an average particle size of 0.55µ and its melt viscosity is 9100 poises.

Graft copolymer (A)-III

The polymerization is performed at 70° C. for 4 hours under the same condition as producing the graft copolymer (A)-II mentioned above, except that the compositions A and B are simultaneously subjected to the bulk polymerization without treating them separately, and immediately transferred to the subsequent suspension polymerization. The resulting graft copolymer is designated (A)-III.

The graft copolymer (A)-III has the rubber of an average particle size of 1.05µ and its melt viscosity is 8,800 poises.

Graft copolymer (B)

A graft copolymer (B) is produced using a polybutadiene latex of a rubber concentration of 50% prepared by a known method.

| Polybutadiene latex | 50 | parts |
|---|---|---|
| Styrene | 72 | " |
| Acrylonitrile | 28 | " |
| Potassium persulfate | 0.5 | " |
| Tertiary dodecylmercaptan | 0.6 | " |
| Disproportionated sodium rhodate | 2 | " |
| Water | 170 | " |

A reactor equipped with a stirrer is charged with 150 parts of water dissolving therein the rubber latex, the mercaptan, the monomer mixture and disproportionated sodium rhodate, and the temperature is elevated to 60° C. At this temperature, 20 parts of water dissolving therein potassium persulfate is added over the period of 3 hours. The polymerization is effected at 60° C. for 3 hours. The resulting graft polymer is added with hydrochloric acid, heated to solidify, dehydrated, washed and then dried. The resulting graft copolymer is designated (B).

The graft copolymer (B) has a melt viscosity of 9,000 poises.

EXAMPLE 1

50 parts of the graft copolymer (A)-I, 30 parts of the graft copolymer (B) obtained by the Referential Example, 20 parts of chlorinated polyethylene having a chlorination degree of 35% ("Daisolac H-35", a product of Osaka Soda K.K.), 0.2 part of triphenyl phosphite and 0.8 part of dibutyl tin maleate as stabilizers are preparatively blended and then extruded into pellets. A specimen is prepared using an injection molding machine (molding temperature of 210° C.) and its properties are measured. The results are illustrated in Table 1.

Comparative Example 1

50 parts of the graft copolymers (A)-I and 50 parts of the graft copolymer (B) obtained by the Referential Example and 0.2 part of triphenyl phosphite are subjected to the same procedure as in Example 1 and the properties of the resulting product are measured.

Comparative Example 2

The procedures and the measurement of the properties are performed in the same way as in Example 1 except that the graft copolymer (B) is not used, and the amount of the graft copolymer (A)-I is changed to 80 parts.

Comparative Example 3

The procedures and the measurement of the properties are performed in the same way as in Example 1 except that the graft copolymer (A)-I is not used, and the amount of the graft copolymer (B) is changed to 80 parts.

The results of Example 1 and Comparative Examples 1 through 3 are altogether illustrated in Table 1 below.

Table-1

| Example | Blend ratio | | | Tensile strength (kg/cm²) | Impact strength (kg-cm/cm) | Luster (%) | Heat deformation temp. (° C) | Coloration |
|---|---|---|---|---|---|---|---|---|
| | Graft copolymer (A)-I | Graft copolymer (B) | Chlorinated polyethylene | | | | | |
| Example 1 | 50 parts | 30 parts | 20 parts | 400 | 24 | 93 | 82 | 0 |
| Comp. Ex. 1 | 50 " | 50 " | — | 430 | 17 | 91 | 80 | 0 |
| Comp. Ex. 2 | 80 " | — | 20 " | 490 | 8 | 92 | 82 | 0 |
| Comp. Ex. 3 | — | 80 " | 20 " | 350 | 14 | 92 | 75 | X |
| Ref. Ex. | 100 " | — | — | 530 | 6 | 91 | 83 | 0 |
| | — | 100 " | — | 390 | 26 | 93 | 77 | 0 |

Incidentally, Table 1 also illustrates the properties of the graft copolymers (A)-I and (B) obtained by the Referential Example. The properties are measured in accordance with the standards set forth below;

tensile property . . . ASTM D-638
impact resistance . . . ASTM D-256
luster . . . ASTM D-53T
heat deformation temperature . . . ASTM D-648

Coloring is evaluated by naked eyes (hereinafter the same).

Due to the synergistic effect between the graft copolymers (A) and (B) and the chlorinated polyethylene, the product of Example 1 has a good balance of properties and large impact resistance, and its coloration also is good.

It is obvious that the products of Comparative Examples 1 and 2 have small impact strength and the product of Comparative Example 3 has considerably worse coloration.

EXAMPLE 2

The procedures and the measurement of the properties are effected under the same condition as in Example 1, except that the blend ratio of the graft copolymers (A)-II and (B) and chlorinated polyethylene having a chlorination degree of 35% ("Daisolac G-235", a product of Osaka Soda K.K.) is changed to 60 parts/30 parts/10 parts and 70 parts/10 parts/20 parts.

Comparative Example 4

The procedures and the measurement of the properties are effected under the same condition as in Example 2, except that the graft copolymer (A)-III is used in place of (A)-II, and the blend ratio of the graft copolymers (A)-III, (B) and the chlorinated polyethylene is changed to 60 parts/30 parts/10 parts.

The results of Example 2 and Comparative Example 4 are altogether illustrated in Table 2.

Table-2

| Example | Blend ratio | | | Tensile strength (kg/cm²) | Impact resistance (kg.cm/cm) | Luster (%) | Heat deformation temp. (° C) | Coloration |
|---|---|---|---|---|---|---|---|---|
| | Graft copolymer (A) | Graft copolymer (B) | Chlorinated polyethylene | | | | | |
| Example 2 | (A)-II 60 parts | 30 parts | 10 parts | 420 | 20 | 91 | 80 | 0 |
| | (A)II 70 " | 10 " | 20 " | 430 | 21 | 90 | 80 | 0 |
| Comp. Ex. 4 | (A)-III 60 " | 30 " | 10 " | 410 | 16 | 78 | 77 | X |

Table-2-continued

| Example | Graft copolymer (A) | Graft copolymer (B) | Chlorinated polyethylene | Tensile strength (kg/cm$^2$) | Impact resistance (kg.cm/cm) | Luster (%) | Heat deformation temp. (° C) | Coloration |
|---|---|---|---|---|---|---|---|---|
| Ref. Ex. | (A)-II 100 " | — | — | 510 | 8 | 89 | 82 | 0 |
|  | (A)-III 100 " | — | — | 450 | 10 | 72 | 80 | 0 |

What is claimed is:

1. An impact-resistant resin composition which consists essentially of a blend of:
   1. 100 parts by weight of a mixture of graft copolymers consisting of;
      50 to 90% by weight of a graft copolymer (A) obtained by polymerizing a monovinyl aromatic hydrocarbon monomer and an ethylenically unsaturated nitrile monomer, in the presence of a diene rubber component, first under bulk polymerization conditions and subsequently continuing the polymerization under suspension polymerization conditions until the polymerization is substantially completed, the number average particle size of said rubber component of said graft copolymer (A) being in the range of from 0.2 to 0.7 microns, and 10 to 50% by weight of a graft copolymer (B) obtained by polymerizing a monovinyl aromatic hydrocarbon monomer, with a monomer selected from the group consisting of an ethylenically unsaturated nitrile monomer, an alkyl ester monomer of acrylic acid or methacrylic acid and mixture thereof in the presence of a diene rubber latex, under emulsion polymerization conditions; and
   2. 3 to 30 parts by weight, per 100 parts by weight of said mixture of said graft copolymers, of a chlorinated polymer having a degree of chlorination of from 25 to 45% by weight and selected from the group consisting of chlorinated polyethylene, chlorinated ethylene-propylene copolymer and chlorinated ethylene-butene copolymer.

2. A resin composition as claimed in claim 1 wherein said diene rubber component of said graft copolymer (A) is selected from the group consisting of butadiene rubber and isoprene rubber.

3. A resin composition as claimed in claim 1 wherein said diene rubber latex for the graft copolymer (B) is selected from the group consisting of polybutadiene latex and butadiene-vinyl monomer copolymer latex.

4. A resin composition as claimed in claim 1 wherein said monovinyl aromatic hydrocarbon monomer for the graft copolymers (A) and (B) is selected from the group consisting of styrene, alpha-methylstyrene, p-methylstyrene and mixtures thereof.

5. A resin composition as claimed in claim 1 wherein said ethylenically unsaturated nitrile monomer for the graft copolymers (A) and (B) is selected from the group consisting of acrylonitrile and methacrylonitrile.

6. A resin composition as claimed in claim 1 wherein said graft copolymer (A) contains from 80 to 55% by weight of said monovinyl aromatic hydrocarbon monomer and from 20 to 45% by weight of said ethylenically unsaturated nitrile monomer.

7. A resin composition as claimed in claim 1 wherein said graft copolymer (A) contains from 2 to 40 parts by weight of said diene rubber component, per 100 parts by weight of the sum of said monovinyl aromatic hydrocarbon monomer and said ethylenically unsaturated nitrile monomer, and said graft copolymer (B) contains from 10 to 100 parts by weight of said diene rubber, per 100 parts by weight of the sum of said monomers for said graft copolymer (B).

8. A resin composition as claimed in claim 1 wherein said graft copolymer (B) contains from 50 to 80% by weight of said monovinyl aromatic hydrocarbon monomer, up to 45% by weight of said ethylenically unsaturated nitrile monomer and up to 50% by weight of said alkyl ester monomer.

9. A resin composition as claimed in claim 1 wherein said graft copolymer (B) contains an alkyl ester monomer in which the alkyl has up to 18 carbon atoms.

10. A resin composition as claimed in claim 1 wherein the chlorinated polymer is used in an amount of 5 to 30 parts by weight.

11. A resin composition as claimed in claim 1 wherein said graft copolymer (A) contains from 2 to 20 parts by weight of said diene rubber component, per 100 parts by weight of the sum of said monovinyl aromatic hydrocarbon monomer and said ethylenically unsaturated nitrile monomer.

* * * * *